United States Patent
Kumar et al.

(10) Patent No.: US 11,704,843 B2
(45) Date of Patent: Jul. 18, 2023

(54) ADVANCED APPLICATION OF COLOR GRADIENTS TO TEXT

(71) Applicant: Adobe Inc., San Jose, CA (US)

(72) Inventors: Harish Kumar, Uttar Pradesh (IN); Praveen Kumar Dhanuka, West Bengal (IN); Arushi Jain, Delhi (IN)

(73) Assignee: Adobe Inc., San Jose, CA (US)

( * ) Notice: Subject to any disclaimer, the term of this patent is extended or adjusted under 35 U.S.C. 154(b) by 295 days.

(21) Appl. No.: 17/191,145

(22) Filed: Mar. 3, 2021

(65) Prior Publication Data

US 2022/0284639 A1 Sep. 8, 2022

(51) Int. Cl.
*G06T 11/00* (2006.01)
*G06F 40/109* (2020.01)
*G06T 11/20* (2006.01)

(52) U.S. Cl.
CPC .......... *G06T 11/001* (2013.01); *G06F 40/109* (2020.01); *G06T 11/203* (2013.01)

(58) Field of Classification Search
None
See application file for complete search history.

(56) References Cited

U.S. PATENT DOCUMENTS

| | | | |
|---|---|---|---|
| 7,412,360 B2 * | 8/2008 | Surazhsky | G06T 19/20 703/2 |
| 7,453,464 B1 * | 11/2008 | Acquavella | G06T 11/60 345/474 |
| 2003/0202212 A1 * | 10/2003 | Burgess | G06T 11/60 358/1.11 |
| 2008/0238927 A1 * | 10/2008 | Mansfield | G06T 11/60 345/467 |
| 2017/0287172 A1 * | 10/2017 | Sykes | G06F 40/171 |
| 2018/0101510 A1 * | 4/2018 | Taylor | G06F 40/171 |
| 2020/0363230 A1 * | 11/2020 | Ueda | G01C 21/3626 |
| 2021/0097323 A1 * | 4/2021 | Wei | G06T 7/73 |

* cited by examiner

*Primary Examiner* — Jeffrey J Chow
(74) *Attorney, Agent, or Firm* — NDWE LLP

(57) ABSTRACT

Embodiments are disclosed for text-aware application of a color gradient to text characters. In particular, in one or more embodiments, the disclosed systems and methods comprise receiving an input including a set of text characters in a first layout, determining a first text path of the set of text characters in the first layout, mapping the set of text characters from the first layout to a second layout, wherein the set of text characters in the second text path are aligned along a coordinate axis, applying a linear color gradient across the mapped set of text characters in the second layout, reverse mapping the set of text characters with the applied linear color gradient from the second layout to the first layout, and outputting the set of text characters in the first layout with the applied linear color gradient from the second layout based on the reverse mapping.

20 Claims, 13 Drawing Sheets
(8 of 13 Drawing Sheet(s) Filed in Color)

ADVANCED APPLICATION OF COLOR GRADIENTS TO TEXT

BACKGROUND

Conventional computer graphic editing systems enable users to create or manipulate images interactively on a computer. One common task in these conventional computer graphic editing systems is the application of color over text characters in an image or other input. When multiple colors are to be applied to a set of text characters, one option is to apply the colors such that there is a hard delineation between adjacent colors. Another option for applying multiple colors to a set of text characters is to apply the colors in a gradient such that neighboring colors are gradually blended from one to another to produce a smooth color transition.

Some existing solutions determine an area that includes all of the text and apply a color gradient across the entire area. However, these solutions typically apply color gradients without any consideration of either the text or a text path, producing undesirable results. For example, when the text path follows a Bezier geometry instead of being linear, the color gradient applied in these existing solutions will be applied either horizontally or vertically across a single bounding box containing the text without any awareness or consideration the text path of the text. Similar, when the text is multi-lined, existing solutions will also apply a color gradient across a single box containing the text.

These and other problems exist with regard to applying color to text.

SUMMARY

Introduced here are techniques/technologies that allow a system to apply a color gradient to a set of text characters such that the application of the color gradient can account for be applied to follow the text path of the set of text characters. The system can receive an input (e.g., a set of text characters, an image, document, or file containing a set of text characters, etc.) and determine an original layout of the set of text characters. The system can map each text character to a converted layout that is aligned to a coordinate axis and apply a color gradient across the set of text characters in the converted layout. The color gradient data generated from applying the color gradient across the set of text characters in the converted layout can then be used to generate the appropriate color gradient for each text character in the set of text characters in the original layout. Thus, embodiments of the present disclosure provide benefits and/or solve one or more of the foregoing or other problems in the existing systems.

In particular, in one or more embodiments, the disclosed systems and methods may include receiving an input including a set of text characters in a first layout. An input analysis of the set of text characters is performed to determine a first text path of the set of text characters in a first layout. The set of text characters is then mapped from the first layout to a second layout having a second text path in which each of the text characters in the set of text characters is aligned along the same coordinate axis. Once in the second layout a linear color gradient is applied across the mapped set of text characters in the second layout. The mapped set of text character with the applied linear color gradient is then reverse mapped from the second layout to the first layout and outputted.

In some embodiments, the text-aware color gradient application system applies the linear color gradient across the mapped set of text characters in the second layout by first determining a global bounding box encompassing the set of text characters in the second layout. The text-aware color gradient application system then receives color stop locations within the global bounding box and a color associated with each color stop location. In some embodiment, for each pair of consecutive color stop locations, the text-aware color gradient application system determines color gradient data for a region of the global bounding box between the pair of consecutive color stop locations by interpolating the region of the global bounding box between the pair of consecutive color stop locations using the colors associated with the pair of consecutive color stop locations.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying drawings in which.

DETAILED DESCRIPTION

One or more embodiments of the present disclosure include a text-aware color gradient application system that applies color gradients over text characters, while taking into consideration the orientation and text path of the text characters. While existing systems are capable of applying color gradients to text, they have their disadvantages. For example, in existing solutions, color gradients are applied to a global space encompassing the text characters, e.g., either vertically or horizontally across a global space encompassing the text characters, without regard to the text path of the text characters. As a result, such systems are unable to apply a color gradient that flows in the direction and along the text path of the text characters.

To address these issues, after receiving an input containing a set of text characters, the text-aware color gradient application system determines an original layout of the set of text characters. The text-aware color gradient application system then maps each text characters to a converted layout that is aligned to a coordinate axis, e.g., by rotating local bounding boxes for each text character such that all of the text characters in the set of text characters are aligned to the same coordinate axis. The text-aware color gradient application system can then apply a color gradient across the set of text characters in the converted layout, and reverse map the set of text characters back to the original layout with the appropriate color gradient data.

Figure 1:
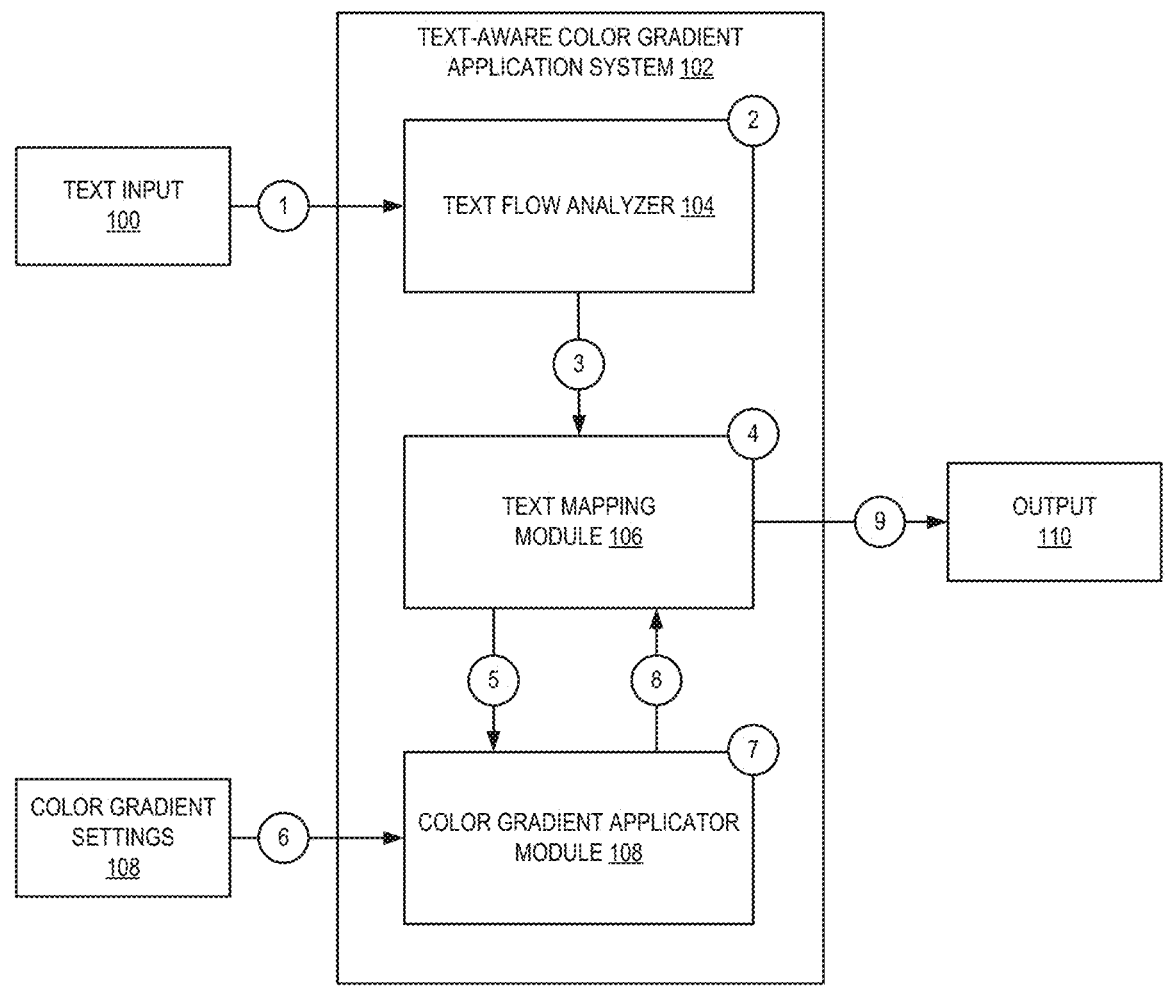
FIG. 1 illustrates a diagram of a process of applying a color gradient to text in accordance with one or more embodiments.

FIG. 1 illustrates a diagram of a process of applying a color gradient to text in accordance with one or more embodiments. In FIG. 1, a text-aware color gradient application system 102 includes a text flow analyzer 104 a text mapping module 106, and color gradient applicator module 108. In other embodiments, the text-aware color gradient application system 102 may include additional, fewer, and/or different modules than illustrated in FIG. 1.

As shown in FIG. 1, in one or more embodiments, the text-aware color gradient application system 102 receives a text input 100, as shown at numeral 1. For example, the text-aware color gradient application system 102 receives the text input 100 from a user via a computing device. In one example, a user may input text characters to the text-aware color gradient application system 102. In another example, a user may input an image containing text characters in a document processing application or an image processing application. In another example, a user may submit the input to a web service or an application configured to receive inputs.

In one or more embodiments, the text input 100 can also include color gradient settings that indicate at least a plurality of color stop locations within the text input 100 in the original layout and colors corresponding to each of the plurality of color stop locations. For example, a user can select locations on the original layout and colors associated with each location using interface elements (e.g., buttons, selectors, etc.).

In one or more embodiments, the text-aware color gradient application system 102 includes a text flow analyzer 104. In one or more embodiments, the text flow analyzer 104 receives the text input 100 and analyzes the text input 100, as shown at numeral 2. In one or more embodiments, the text flow analyzer 104 analyzes the text input 100 to identify text characters and determine an original layout of the text characters. In one or more embodiments, determining the original layout of the text characters includes determining a first text path of the text characters. For example, the first text path of the text characters can include the text characters placed along a curved, or otherwise non-linear, path (e.g., a Bezier curve). In another example, the first text path of the text characters can be linear or non-linear, and include spacing between consecutive text characters (e.g., space between text characters or text characters in multiple lines).

In one or more embodiments, the text flow analyzer 104 can generate text character mapping data based on the analysis. In one or more embodiments, the text character mapping data includes information identifying each text character of the set of text characters in the text input 100. In one or more embodiments, the text flow analyzer 104 determines an orientation (e.g., an angle of rotation) for each text character in the first text path of the text input 100 relative to a coordinate axis (e.g., x-axis or y-axis). In one or more embodiments, the text character mapping data includes information indicating how the text characters are to be mapped from the original layout in the text input 100 to a converted layout. For example, text character mapping data can include coordinate information mapping bounding boxes for text characters between the original layout and the converted layout, amounts of rotation that bounding boxes are rotated from a coordinate axis (e.g., x-axis or y-axis), etc. In one or more embodiments, this coordinate information is stored in matrices.

In one or more embodiments, the text flow analyzer 104 can further include information in the text character mapping data includes identifying whether the set of text characters are in a single line or multiple lines. In one or more embodiments, the text flow analyzer 104 can determine the amount of "white space" between consecutive text characters in the set of text characters. In these embodiments, the text character mapping data can identify character spacing and/or paragraph/line separation data.

In one or more embodiments, the text flow analyzer 104 then sends the text character mapping data to the text mapping module 106, as shown at numeral 3. In one or more embodiments, the text flow analyzer 104 can alternatively, or additionally, send the text character mapping data to a storage location for later access by the text mapping module 106.

In one or more embodiments, the text mapping module 106 maps the text characters from the original layout of the text input 100 to a converted layout, as shown at numeral 4. In one or more embodiments, the text mapping module 106 maps the text characters from the original layout to the converted layout using the text character mapping data generated by the text flow analyzer 104. In one or more embodiments, the converted layout includes the set of text characters in a second text path, where the second text path is different from the first text path. For example, the text mapping module 106 can map the set of text characters from a non-linear first text path to a second text path where the set of text characters are linearly aligned along a coordinate axis (e.g., x-axis or y-axis).

In one or more embodiments, mapping the text characters to the converted layout includes using the text character mapping data indicating an amount of rotation to rotate the text characters from the original layout in text input 100 to the converted layout. In one or more embodiments, when mapping the original layout to the converted layout, the text mapping module 106 generates local bounding boxes for each text character. In one or more embodiments, the shape of a local bounding box for a text character is generated based on the text character's size and its orientation with respect to a text path of the original layout. In such embodiments, when the text mapping module 106 maps the local bounding boxes from the original layout to the converted layout, the orientations of each text character relative to the other text characters and the text path of the original layout can be maintained.

In one or more embodiments, the text mapping module 106 can further modify the converted layout by modifying an amount of spacing, or "white space," between consecutive text characters. For example, the text mapping module 106 can adjust the kerning values between consecutive text characters to reduce or eliminate the amount of spacing between text characters. In one or more embodiments, the text mapping module 106 can obtain left bearing and right bearing data for each character of a given font, and the text mapping module 106 can eliminate the "white space" between two consecutive characters by compensating for the right bearing of a first character and/or the left bearing of a second character. By eliminating the spacing between consecutive text characters, when a color gradient is applied to the converted layout, the color gradient is not applied to the spacing between text characters. In one or more embodiments, where the text input 100 includes text characters in multiple lines, the text mapping module 106 can remove any line or paragraph separators from the text input 100 so that the text characters in multiple lines in the original layout are oriented into a single line in the converted layout.

In one or more embodiments, after mapping the text input 100 from the original layout to the converted layout, the text mapping module 106 generates a global bounding box encompassing the text characters in the converted layout. In one or more embodiments, the global bounding box can be approximately the length of the combined length of the local bounding boxes and approximately the height of the tallest bounding box.

In one or more embodiments, the text mapping module 106 then sends the converted layout to the color gradient applicator module 108, as shown at numeral 5.

In one or more embodiments, the color gradient applicator module 108 receives color gradient settings 108, as shown at numeral 6. In one or more embodiments, the color gradient settings 108 includes at least a plurality of color stop locations within the global bounding box and colors corresponding to each of the plurality of color stop locations used for applying the color gradient. In one or more embodiments, the color gradient applicator module 108 receives the color gradient settings 108 from a user (e.g., from a user computing device or via information provided by the user via the user computing device). For example, the text-aware color gradient application system 102 can display the converted layout, including the global bounding box. to the user, e.g., in a graphical user interface (GUI), and receive the color gradient settings 108 via user interactions with the GUI. In one or more embodiments where the text input 100 includes color gradient settings, the color gradient settings 108 received at numeral 6 can be optionally received as an update to the earlier received color gradient settings.

In one or more embodiments, the color stop locations are defined relative to a [0,1] space of the global bounding box, where the coordinates of a first side of the global bounding box, where a color gradient starts, is at 0 and the second side of the global bounding box, where the color gradient ends, is at 1. In such embodiments, all points along the length of the global bounding box fall between 0 and 1. In one or more embodiments, the color stop locations can be defined relative to a particular text character. For example, given a text input of "GRADIENT," the color stop locations can be defined as "red" at text character "G," "orange" at text character "A," etc.

In one or more embodiments, the color gradient applicator module 108 applies a linear color gradient across the set of text characters in the converted layout using the color stop locations colors associated with each color stop location, as shown at numeral 7. In one or more embodiments, the color gradient applicator module 108 applies a linear color gradient across the mapped set of text characters in the global bounding box of the converted layout. In one or more embodiments, based on the received color stop locations and colors, the color gradient applicator module 108 determines color gradient data by interpolating the regions between pairs of consecutive color stop locations of the global bounding box using the colors associated with the pair of consecutive color stop locations.

In one or more embodiments, the text-aware color gradient application system 102 generates a render tree that includes a nodes in an appropriate hierarchy, where the nodes containing information for objects that are to be rendered/drawn. In one or more embodiments, the text-aware color gradient application system 102 modifies the nodes of text character objects to include additional gradient metadata. In one or more embodiments, the gradient metadata includes the gradient paint color and details of the mapping of the text object between the original layout and the converted layout. The details of the mapping can include the total bounds of the converted layout and local transformation data for each text character in the text input 100, which can be used to map the local bounding box for a text character between the original layout and the converted layout.

As the render tree is traversed, each node is rendered based on draw calls issued to a GPU. When a node does not include any additional gradient metadata, the node is rendered in an ordinary manner. When a node does include additional gradient metadata, a color gradient is drawn and the color gradient is applied to the text character object associated with the node. In one or more embodiments, draw calls are issued for the text character object that can include multiple inputs. In one or more embodiments, the inputs can include each text character geometry (e.g., local bounding box for a text character) represented as a quad, a text character bitmap texture (e.g., a greyscale texture depicting the shape of the text character), a color gradient raster texture of the global bounding box, a transform matrix from the coordinate system of the text-aware color gradient application system 102 to the coordinate system of a device upon which the objects will be rendered, and a transform matrix from the coordinate system of the device to a layout space of the converted layout. In one or more embodiments, the transform matrix from the coordinate system of the device to a layout space of the converted layout is unique for each text character in a draw call and can be computed by the following algorithm:

procedure GETMAPPING(o, n)
    $l_o$, $l_n$ ← bottom line of text character bound of (o) and (n), respectively
    $l_0$ ← TRANFORM($l_o$, o, mat)
    $l_n$ ← TRANFORM($l_n$, n, mat)
    $\theta \leftarrow \theta_{lo} - \theta_{ln}$
    mat($Tr_{(ln,A)}$*$Rot_\theta$*$TR_{(-lo,A)}$)
    return mat where o is the text character in the original layout and n is the text character in the converted layout.

In one or more embodiments, to draw the color gradient, a global bounding box is created by summing the lengths of all of the local bounding boxes of the text characters, and the color gradient is then applied to the global bounding box to generate a gradient texture for the global bounding box. In one or more embodiments, the color values for a text character are then selected from the color gradient applied to the global bounding box. For example, draw calls will be issued to the GPU for a local bounding box for a text character (e.g., "A") in the form of triangles.

In one or more embodiments, the GPU includes a vertex shader and a fragment shader. In one or more embodiments, a vertex shader is executed for each vertex of an input geometry (e.g., the quad of each text character). In one or more embodiments, for every point in that quad of a text character, the vertex shader determines the corresponding position in the gradient texture. This will identify the color that will be read from the gradient texture for that point. In one or more embodiments, the vertex shader further determines text character texture coordinates, or text character texture, by rasterizing the text character (e.g., convert the text character into a bitmap or set of pixels).

In one or more embodiments, the data from the vertex shader is then passed to the fragment shader. In one or more embodiments, the fragment shader is executed for each pixel within the text character. For example, the fragment shader will read the color from the gradient texture and the shape from the text character texture, and the fragment shader multiples the color and shape to determine the final color for the given pixel. In one or more embodiments, the final color for the given pixel is then drawn onto the framebuffer that is presented on a screen of a computing device.

In one or more embodiments, the color gradient applicator module 108 then sends the converted layout with the applied linear color gradient to the text mapping module 106, as shown at numeral 8. In one or more embodiments, the color gradient applicator module 108, can additionally, or alternatively, send color gradient data to a storage location for later access by the text mapping module 106.

At numeral 9, the text-aware color gradient application system 102 returns an output 110 to the user. In one or more embodiments, the text mapping module 106 generates the output 110 by reverse mapping the set of text characters with the applied linear color gradient from the converted layout to the original layout. In one or more embodiments, after the process described above in numerals 1-8, the output 110 is sent to the user or computing device that initiated the color gradient application process with the text-aware color gradient application system 102. For example, after the process described above in numerals 1-8, a user interface displays the text characters in the original layout with the applied color gradient.

Figure 2:
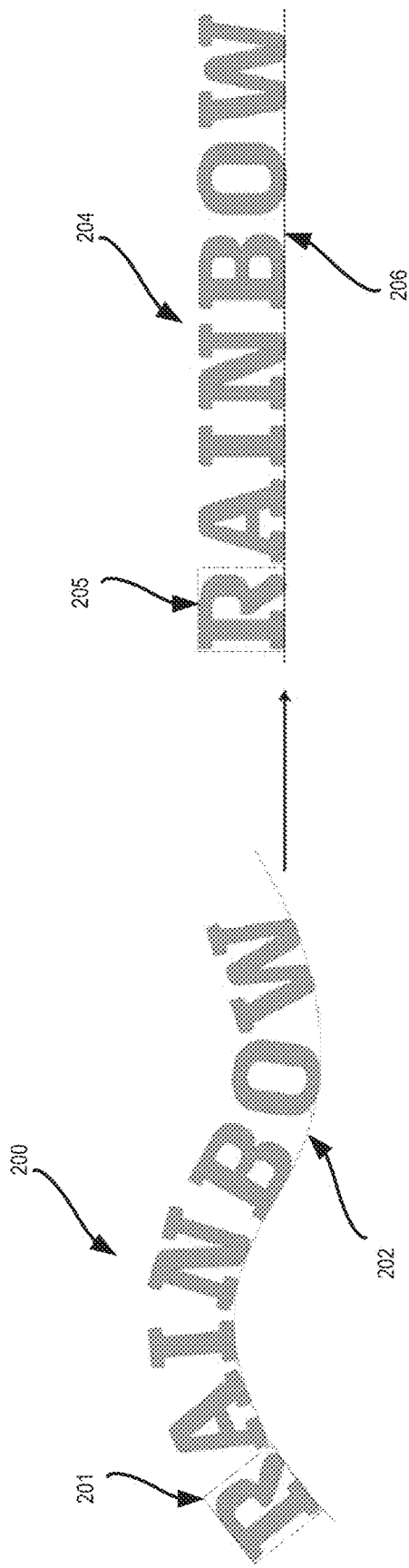
FIG. 2 illustrates a result of mapping text characters from an original layout to a converted layout in accordance with one or more embodiments.

FIG. 2 illustrates a result of mapping text characters from an original layout to a converted layout in accordance with one or more embodiments. In FIG. 2, a text-aware color gradient application system 102 receives an input in an original layout 200 that includes a set of text characters, "RAINBOW," in which the characters are oriented along a non-linear text path illustrated by line 202. In one or more embodiments, the text flow analyzer 104 analyzes the input to identify each of the text characters. In one or more embodiments, the text flow analyzer 104 identifies each of the text characters further includes determining or generating a bounding box around each text character in the original layout 200. For example, each text character in "RAINBOW" is separated into its own local bounding box (e.g., bounding box 201 around the text character "R").

In one or more embodiments, the text mapping module 106 maps the text characters into a converted layout 204. In one or more embodiments, the text mapping module 106 maps each text character from the original layout 200 to the converted layout 204 by performing a local transformation on each bounding box. For example, the local transformation can be a rotation of the bounding box from its orientation in the original layout 200 until it is aligned with a coordinate axis. As illustrated in FIG. 2 bounding box 201 has been rotated from its orientation in the original layout 200 to its orientation depicted by bounding box 205. In the example, text character was rotated to be aligned along a linear path (e.g., the x-axis) illustrated by line 206. The same process can be performed with all the text characters in the original layout 200 to map the text characters to the converted layout 204.

Figure 3:
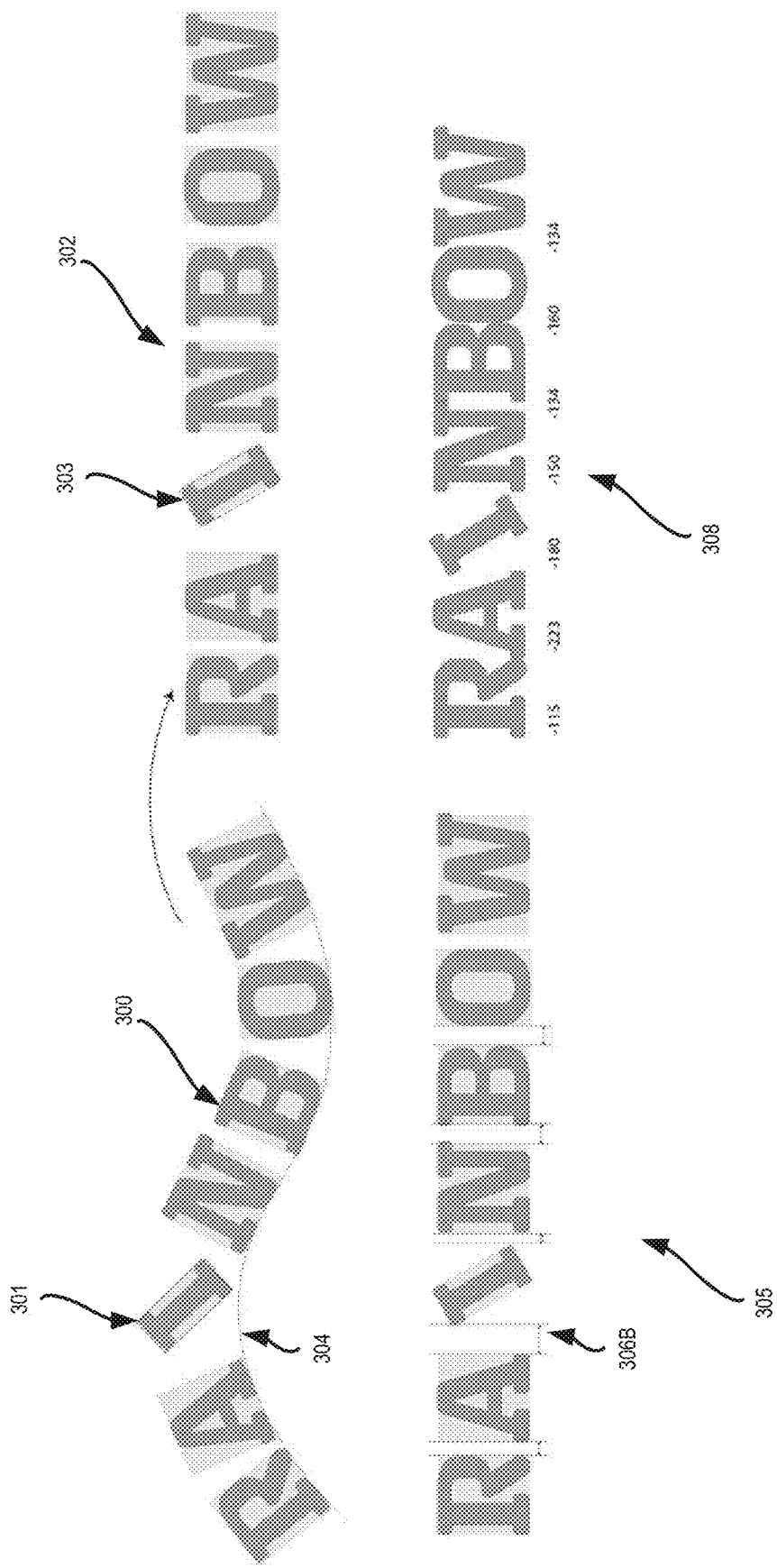
FIG. 3 illustrates a result of performing modifications to a converted layout in accordance with one or more embodiments.

FIG. 3 illustrates a result of performing modifications to a converted layout in accordance with one or more embodiments. In FIG. 3, a text-aware color gradient application system 102 receives an input in an original layout 300 that includes a set of text characters, "RAINBOW," in which the characters are oriented along a non-linear text path illustrated by line 304. Similar to the example illustrated in FIG. 2, each of the text characters in the original layout 300 has been rotated to be along a linear path to generate converted layout 302. As illustrated in FIG. 3, the original layout 300 includes a text character, "I," that is rotated such that the bottom of the text character is not aligned with the non-linear flow of the other text characters. When the bounding box 301 around the text character "I" is mapped to a bounding box 303 in the converted layout 302, the rotation relative to the other text characters is maintained.

In one or more embodiments, in addition to mapping the original layout 300 to the converted layout 302, the text mapping module 106 can perform additional modifications to the converted layout 302. In one or more embodiments, the text mapping module 106 can perform kerning to modify the amount of space between consecutive text characters. For example, the text mapping module 106 can modify the converted layout 302 such that any spacing, or "white space," between consecutive text characters is increased, reduced, or eliminated. As illustrated in FIG. 3, converted layout 305 depicts the amount of spacing between consecutive text characters. For example, label 306A indicates the amount of spacing between text characters "R" and "A", label 306B indicates the amount of spacing between text characters "A" and "I," etc. Converted layout 308 depicts the result of kerning the converted layout 302 to remove the space between text characters.

In one or more embodiments, the text mapping module 106 maintains the relative positions of the text characters when mapped from the original layout to the converted layout. In such embodiments, this ensures that the space between consecutive text characters in the converted layout is the same as the space between the consecutive text characters in the original layout. In one embodiment, the text mapping module 106 maintains the relative positions of the text characters by determining the distance between the tops of the bounding boxes of consecutive text characters and the distance between the bottoms of the bounding boxes of consecutive character, and then calculating the average of the two distances.

Figure 4:
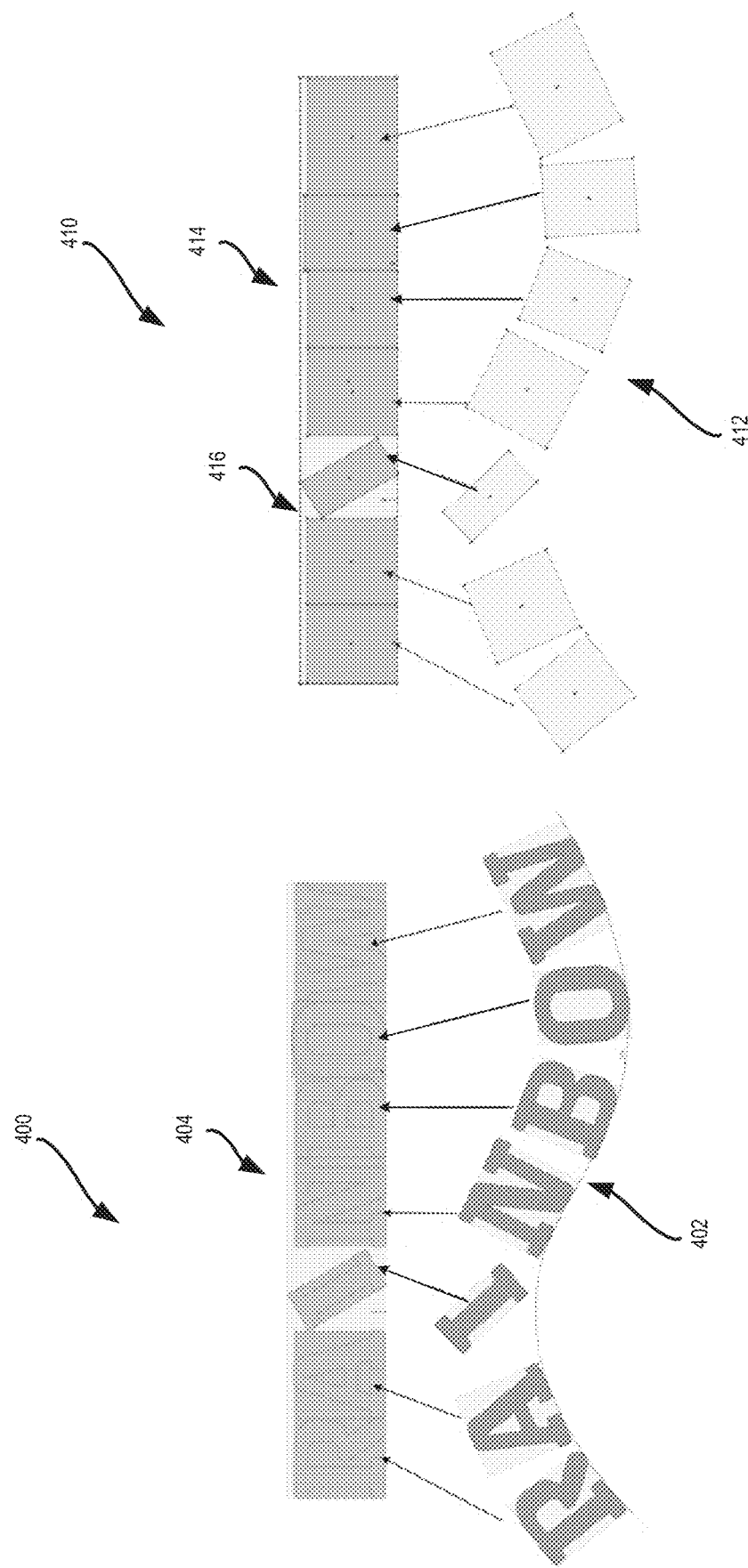
FIG. 4 illustrates a global bounding box of a converted layout in accordance with one or more embodiments.

FIG. 4 illustrates a global bounding box of a converted layout in accordance with one or more embodiments. FIG. 4 includes two views of a converted layout: a text view 400 depicting the converted layout including the text characters and a bounding box view 410 depicting the converted layout including a set of local bounding boxes and a global bounding box. FIG. 4 illustrates a text view 400 of a mapping of text characters "RAINBOW" from an original layout 402 to a converted layout 404, as described with respect to FIG. 4.

FIG. 4 further illustrates a bounding box view 410 of the mapping of text characters "RAINBOW" from an original layout 412 to a converted layout 414. The original layout 412 in the bounding box view 410 is depicted as a set of local bounding boxes, where each bounding box of the set of local bounding boxes is created for one of the text characters in "RAINBOW." After mapping the original layout 412 to the converted layout 414, a text converter (e.g., text mapping module 106) creates a global bounding box 416 that encompasses the local bounding boxes. For example, the global bounding box 416 is approximately the length of the set of local bounding boxes and approximately the height of the tallest local bounding box.

Figure 5:
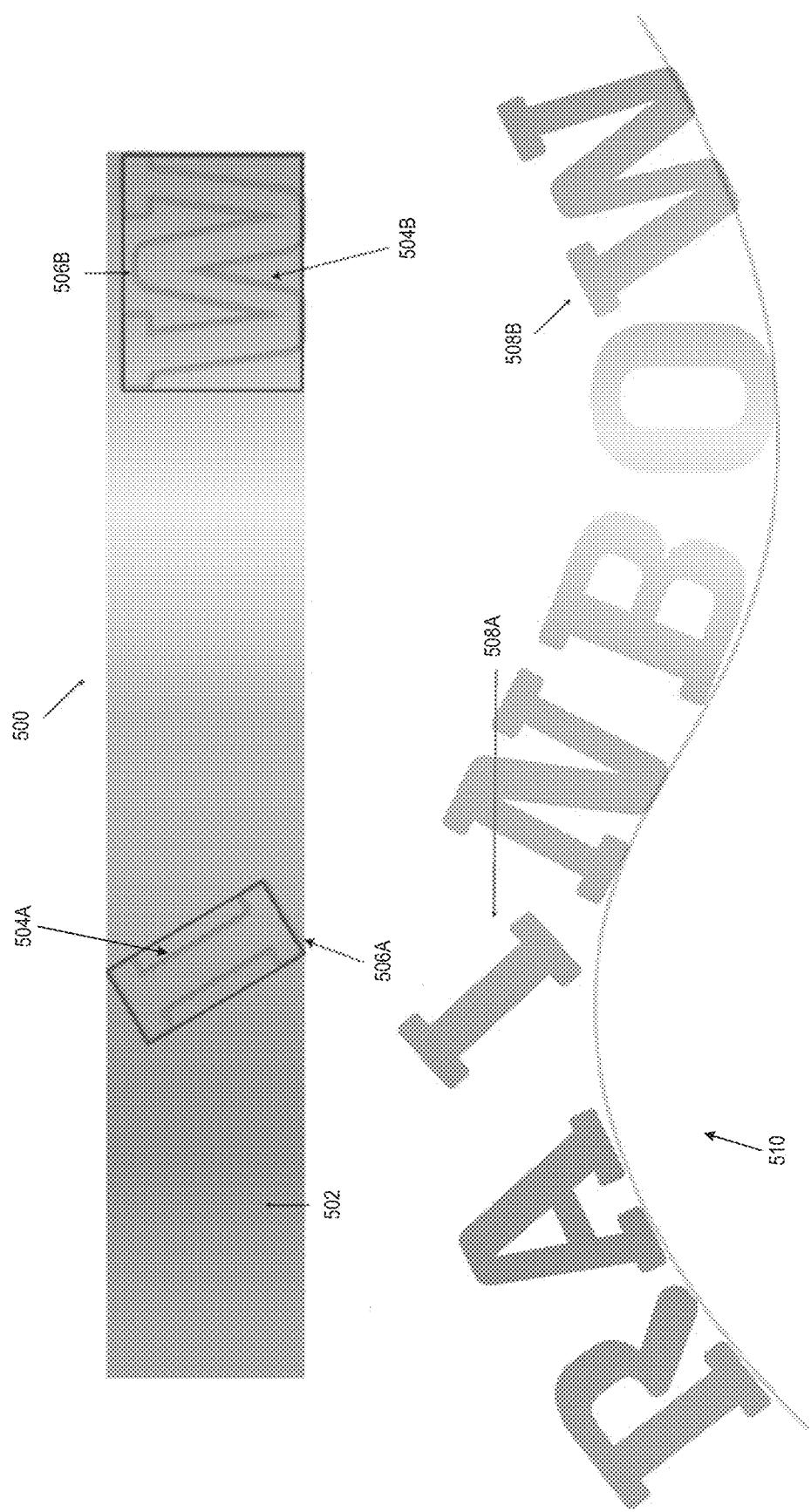
FIG. 5 illustrates an application of a color gradient to a set of text characters in accordance with one or more embodiments.

FIG. 5 illustrates an application of a color gradient to a set of text characters in accordance with one or more embodiments. FIG. 5 illustrates a converted layout 500 after application of a color gradient by a text-aware color gradient application system (e.g., text-aware color gradient application system 102). The converted layout 500 includes a global bounding box 502. As illustrated in FIG. 5, only text characters "I" 504A and "W" 504B from the set of text characters "RAINBOW" are shown in the global bounding box 502. The text characters "I" 504A and "W" 504B are contained within local bounding boxes 506A and 506B, respectively.

In one or more embodiments, the text-aware color gradient application system 102 applies a linear color gradient across the set of text characters in the converted layout 500 using received inputs indicating color stop locations within the global bounding box 502 and a color associated with each color stop location. In one or more embodiments, based on the received color stop locations and colors, the text-aware color gradient application system 102 determines color gradient data by interpolating the regions between pairs of consecutive color stop locations of the global bounding box 502 using the colors associated with the pair of consecutive color stop locations.

In one or more embodiments, after the text-aware color gradient application system 102 determines the color gradient data, the text-aware color gradient application system 102 reverse maps the set of text characters with the applied linear color gradient from the converted layout 500 to the original layout 510.

Figure 6:
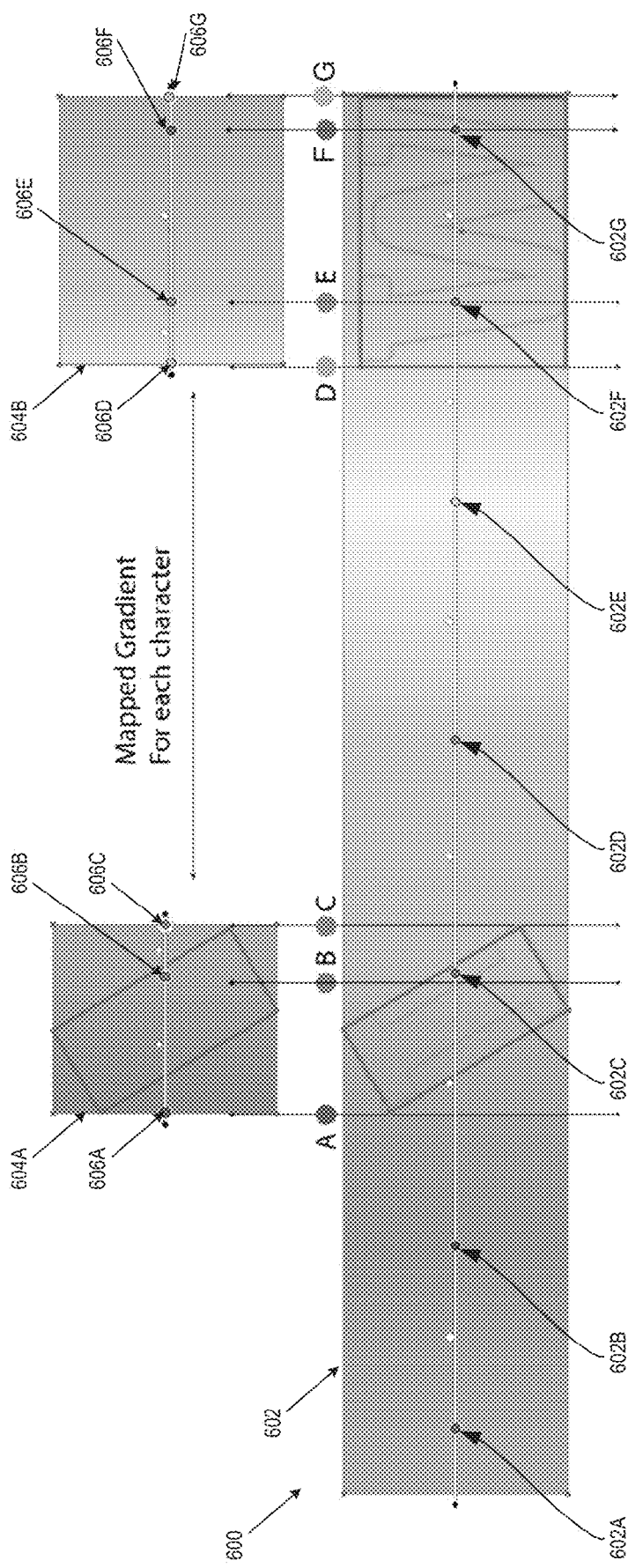
FIG. 6 illustrates a process of generating color gradient data in accordance with one or more embodiments.

FIG. 6 illustrates a process of generating color gradient data in accordance with one or more embodiments. FIG. 6 illustrates a converted layout 600 after application of a color gradient by a text-aware color gradient application system (e.g., text-aware color gradient application system 102). The converted layout 600 includes a global bounding box 602. The converted layout 600 includes a plurality of color stop locations 602A-602G and a corresponding color for each of the plurality of color stop locations 602A-602G. As illustrated in FIG. 6, only text characters "I" and "W" from the set of text characters "RAINBOW" are shown in the global bounding box 602.

In one or more embodiments, to preserve the color gradient applied by the text-aware color gradient application system 102 when exported to certain applications or file types, color gradient data is calculated for each text character. In one or more embodiments, the text-aware color gradient application system determines the local bounding boxes for each text character in the converted layout 600. For example, local bounding box 604A is the x-axis aligned bounding bound for text character "I", and local bounding box 604B is the x-axis aligned bounding bound for text character "W."

In one or more embodiments, the text-aware color gradient application system 102 then determines the local color gradient over each of the individual local bounding boxes (e.g., 604A, 604B). In one or more embodiments, the text-aware color gradient application system 102 identifies whether there are any color stop locations associated with the global bounding box 602 for the converted layout 600 that lies within the local bounding box. For example, the text-aware color gradient application system 102 identifies that color stop location 602C lies within local bounding box 604A and that color stop locations 602F and 602G lie within local bounding box 604B. As illustrated in FIG. 6, color stop location 606B in local bounding box 604A is equivalent to color stop location 602C in global bounding box 602. Similarly, color stop locations 606E and 606F in local bounding box 604B are equivalent to color stop locations 602F and 602G in global bounding box 602.

In one or more embodiments, after identifying the intermediate color stop locations within each local bounding box (e.g., color stop location 606B in local bounding box 604A and color stop locations 606E and 606F in local bounding box 604B, the text-aware color gradient application system 102 then adds a start color stop location at the start of each local bounding box and an end color stop location at the end of each local bounding box. Continuing the example, the text-aware color gradient application system 102 adds start color stop location 606A and end color stop location 606C to local bounding box 604A. Similarly, the text-aware color gradient application system 102 adds start color stop location 606D and end color stop location 606G to local bounding box 604B. In one or more embodiments, the text-aware color gradient application system 102 then detects the color associated with each of the added color stop locations. For example, the text-aware color gradient application system 102 can detect the color for the added color stop locations based on the colors at their positions in the global bounding box 602.

Figure 7:
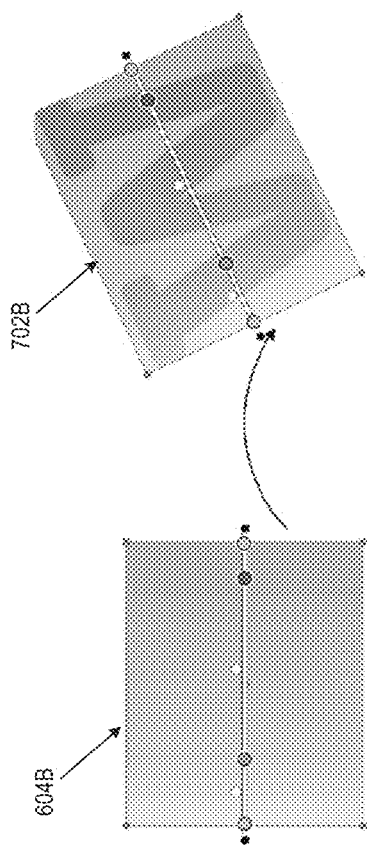
FIG. 7 illustrates additional details of a process of generating color gradient data in accordance with one or more embodiments.
Figure 7:
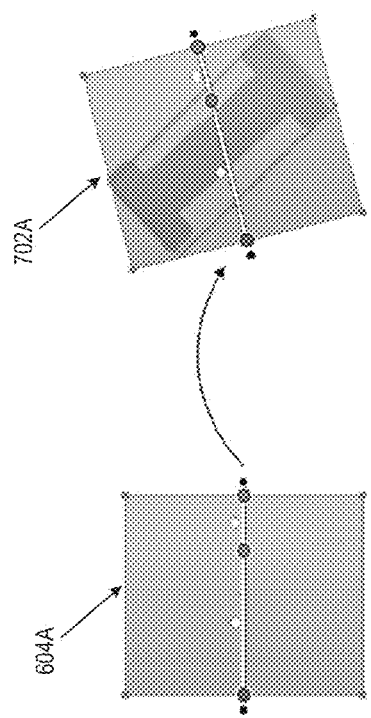

FIG. 7 illustrates additional details of a process of generating color gradient data in accordance with one or more embodiments. In one or more embodiments, after determining the color gradient data for each of the local bounding boxes, as described with respect to FIG. 6, the text-aware color gradient application system 102 further stores any applicable local transformation data associated with the local bounding boxes 604A and 604B. In one or more embodiments, the text-aware color gradient application system 102 can retrieve the local transformation data from a storage location storing text character mapping data generated by a text flow analyzer. In one or more embodiments, the local transformation data indicates an amount of rotation to map a local bounding box from its position in an original layout to its position in the converted layout. As illustrated in FIG. 7, the local transformation data for local bounding box 604A results in a bounding box 702A, and the local transformation data for local bounding box 604B results in a bounding box 702B.

Figure 8:
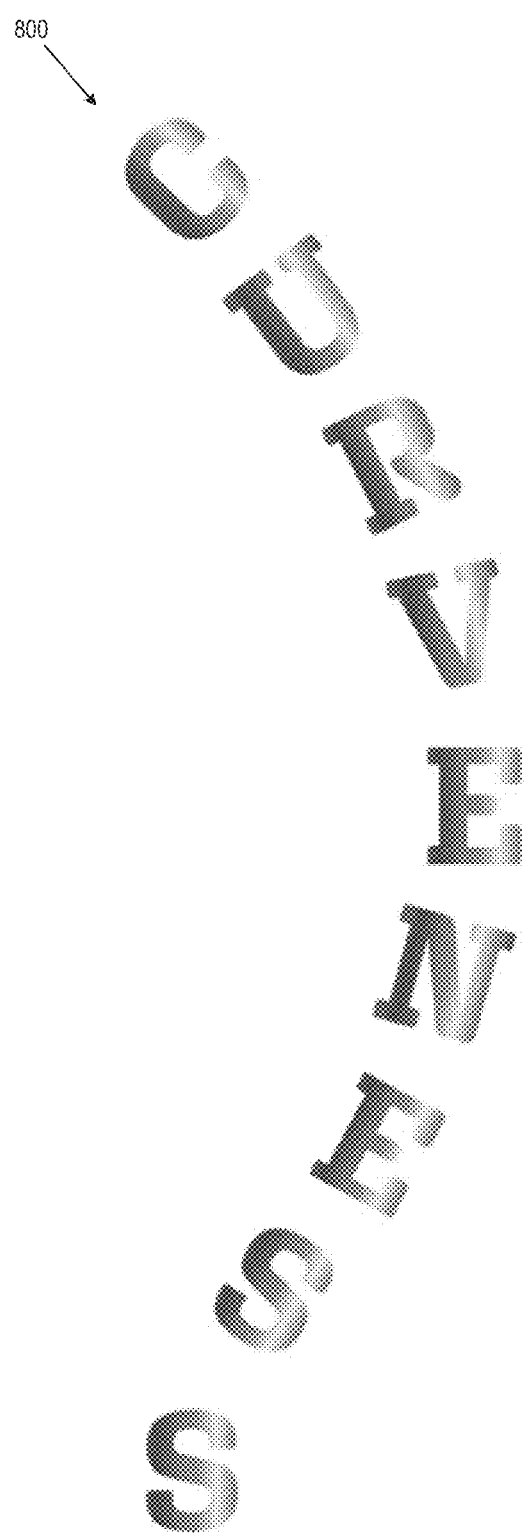
FIG. 8 illustrates an example output of the text-aware color gradient application system in accordance with one or more embodiments.

FIG. 8 illustrates an example output of the text-aware color gradient application system in accordance with one or more embodiments. As illustrated in FIG. 8, the output 800 includes a set of text characters, "CURVENESS," following the application of a color gradient. In one or more embodiments, the text-aware color gradient application system generates output 800 by first receiving an input that includes the set of text characters, "CURVENESS." In one or more embodiments, text-aware color gradient application system determines the original layout of the input and maps the set of text characters to a coordinate axis. In the example of FIG. 8, the text-aware color gradient application system can determine that the set of text characters are oriented vertically. In response, the text-aware color gradient application system maps the set of text characters such that the left side of each text character in a converted layout is aligned to the y-axis. In one or more embodiments, the text-aware color gradient application system then applies a color gradient across a global bounding box containing the converted layout. For example, the color gradient is applied from the left side of each text character across to the right side of each text character, or vice versa. In one or more embodiments, when the set of text characters with the applied color gradient is reverse mapped back to the original layout, the output 800 depicts the set of text characters with the applied color gradient in the original layout. In one or more embodiments, applying the color gradient in this manner produces a more desirable output than existing systems.

Figure 9:
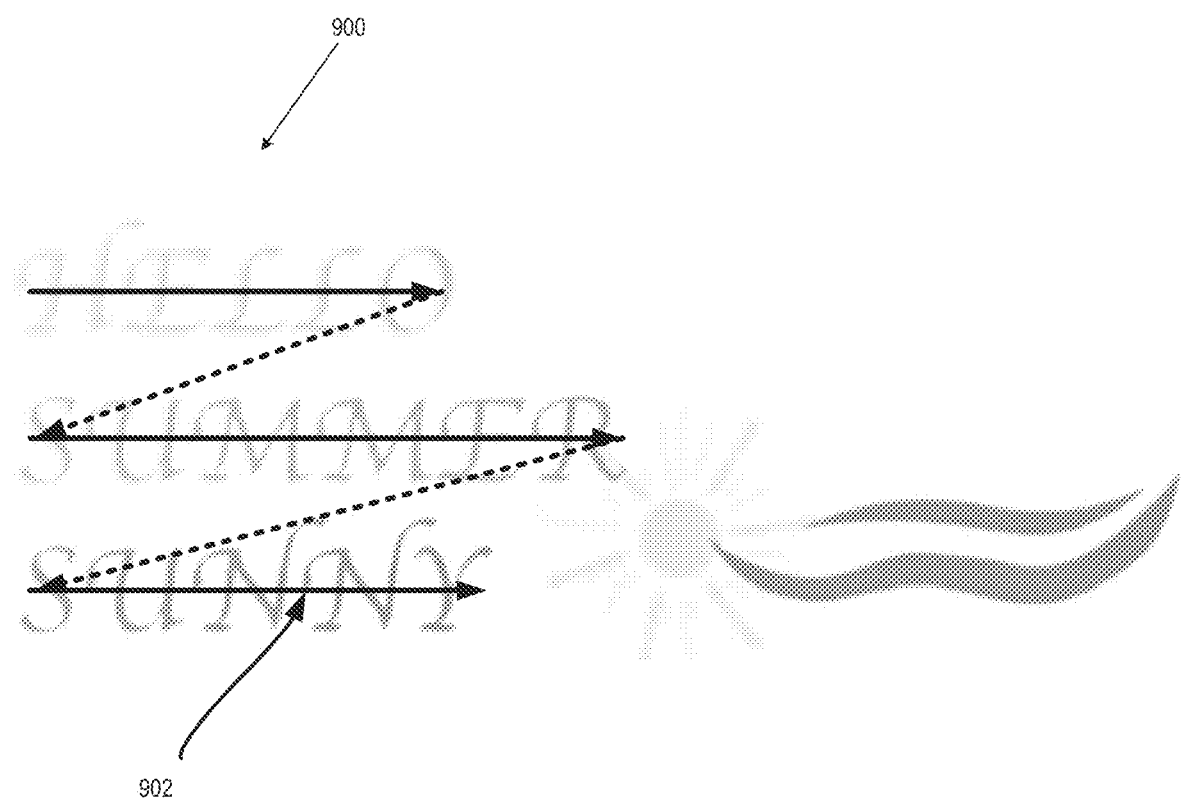
FIG. 9 illustrates an example output of the text-aware color gradient application system in accordance with one or more embodiments.

FIG. 9 illustrates an example output of the text-aware color gradient application system in accordance with one or more embodiments. As illustrated in FIG. 9, the output 900 includes a set of text characters, "HELLO SUMMER SUNNY," following the application of a color gradient. As further illustrated in FIG. 9, the set of text characters in the original layout is multi-lined, with the path of the applied color gradient indicated by the arrow 902. In one or more embodiments, the text-aware color gradient application system generates output 900 by first receiving an input that includes the set of text characters, "HELLO SUMMER SUNNY." In one or more embodiments, text-aware color gradient application system determines the original layout of the input and maps the set of text characters to a coordinate axis. In the example of FIG. 9, the text-aware color gradient application system can determine that the set of text characters are arranged in multiple lines. In response, the text-aware color gradient application system maps the set of text characters to a converted layout by removing any line/paragraph separator and aligns the local bounding boxes of each text characters to the x-axis. In one or more embodiments, the text-aware color gradient application system then applies a color gradient across a global bounding box containing the converted layout. For example, the color gradient is applied in the direction of the arrow 902 starting with the first word, "HELLO" and continuing through "SUMMER" and "SUNNY." In one or more embodiments, when the set of text characters with the applied color gradient is reverse mapped back to the original layout, the output 900 depicts the set of text characters with the applied color gradient in the original multi-lined layout, with the dashed portion of arrow 902 indicating the continuation of the applied color gradient from one line of text characters to the next line of text characters.

Figure 10:
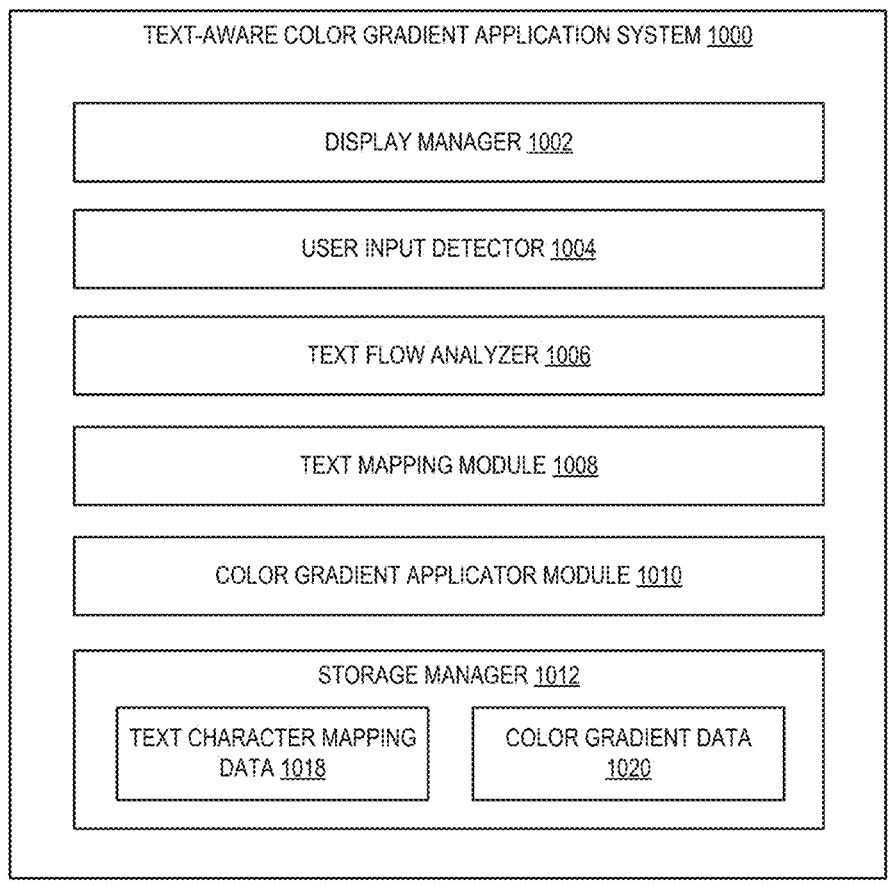
FIG. 10 illustrates a schematic diagram of a text-aware color gradient application system in accordance with one or more embodiments.

FIG. 10 illustrates a schematic diagram of a text-aware color gradient application system (e.g., "text-aware color gradient application system" described above) in accordance with one or more embodiments. As shown, the text-aware color gradient application system 1000 may include, but is not limited to, a display manager 1002, a user input detector 1004, a text flow analyzer 1006, a text mapping module 1008, and a color gradient applicator module 1010, and a storage manager 1012. The storage manager 1012 includes text character mapping data 1018 and color gradient data 1020.

As illustrated in FIG. 10, the text-aware color gradient application system 1000 includes a display manager 1002. In one or more embodiments, the display manager 1002 identifies, provides, manages, and/or controls a user interface provided on a touch screen or other device. Examples of displays include interactive whiteboards, graphical user interfaces (or simply "user interfaces") that allow a user to view and interact with content items, or other items capable of display on a touch screen. For example, the display manager 1002 may identify, display, update, or otherwise provide various user interfaces that include one or more display elements in various layouts. In one or more embodiments, the display manager 1002 can identify a display provided on a touch screen. For example, a display provided on a touch screen may include a graphical user interface including one or more display elements capable of being interacted with via one or more touch gestures or other types of user inputs (e.g., using a stylus, a mouse, or other input devices). In one or more other embodiments, the display manager 1002 can identify other types of displays (e.g., including monitors, projectors, headsets, etc.) that may be interacted with using a variety of input devices.

More specifically, the display manager 1002 can identify a variety of display elements within a graphical user interface as well as the layout of the graphical user interface. For example, the display manager 1002 may identify a graphical user interface provided on a touch screen including one or more display elements. Display elements include, but are not limited to buttons, text boxes, menus, thumbnails, scroll bars, hyperlinks, etc. In one or more embodiments, the display manager 1002 can identify a graphical user interface layout as well as the display elements displayed therein.

As further illustrated in FIG. 10, the text-aware color gradient application system 1000 also includes a user input detector 1004. In one or more embodiments, the user input detector 1004 detects, receives, and/or facilitates user inputs in any suitable manner. In some examples, the user input detector 1004 detects one or more user interactions. As referred to herein, a "user interaction" means a single input, or combination of inputs, received from a user by way of one or more input devices, or via one or more touch gestures. A user interaction can have variable duration and may take place relative to a display provided on a touch screen.

For example, the user input detector 1004 can detect user inputs performed on a touch screen. In particular, the user input detector 1004 can detect one or more touch gestures (e.g., tap gestures, swipe gestures, pinch gestures) provided by a user by way of the touch screen. In some embodiments, the user input detector 1004 can detect touch gestures based on one point of contact or multiple points of contact on the touch screen. In some examples, the user input detector 1004 can detect touch gestures in relation to and/or directed at one or more display elements displayed as part of a display presented on the touch screen. In one or more embodiments, the user inputs can include those performed by a user to send inputs to the text-aware color gradient application system 1000.

The user input detector 1004 may additionally, or alternatively, receive data representative of a user interaction. For example, the user input detector 1004 may receive one or more user configurable parameters from a user, one or more commands from the user, and/or any other suitable user input. In particular, the user input detector 1004 can receive voice commands or otherwise sense, detect, or receive user input.

As further illustrated in FIG. 10, the text-aware color gradient application system 1000 also includes a text flow analyzer 1006. In one or more embodiments, the text flow analyzer 1006 is configured to analyze an input including a set of text characters. In one or more embodiments, the text flow analyzer 1006 analyzes the set of text characters to determine a text path of the set of text characters and the orientation of individual text characters. In one or more embodiments, the text flow analyzer 1006 can generate text character mapping data indicating how the text characters are to be mapped from the original layout in the input to a converted layout. For example, text character mapping data can include data indicating a bounding box for each text character in the input, character spacing and/or paragraph/line separation data, amounts of rotation that bounding boxes are rotated between the original layout and the converted layout so that the bounding boxes are aligned to a coordinate axis (e.g., x-axis or y-axis), etc.

As further illustrated in FIG. 10, the text-aware color gradient application system 1000 also includes a text mapping module 1008 configured to map an input set of text characters from an original layout to a converted layout based on text character mapping data. In one or more embodiments, the text-aware color gradient application system 1000 also includes a color gradient applicator module 1010 configured to apply a color gradient to the set of text characters in the converted layout based on received color gradient settings data, and reverse map the set of text characters with the applied linear color gradient from the converted layout to the original layout.

As illustrated in FIG. 10, the text-aware color gradient application system 1000 also includes the storage manager 1012. The storage manager 1012 maintains data for the text-aware color gradient application system 1000. The storage manager 1012 can maintain data of any type, size, or kind as necessary to perform the functions of the text-aware color gradient application system 1000. The storage manager 1012, as shown in FIG. 10, includes the text character mapping data 1018 and color gradient data 1020. The text character mapping data 1018 can include data generated from analyzing an input including a set text characters used by the text-aware color gradient application system 1000 for mapping the set of text characters from an original layout to a converted layout. In one or more embodiments, the mapping data is stored as matrix data mapping the coordinates of the local bounding boxes for each text character from the original layout to the converted layout. In one or more embodiments, the color gradient data 1020 can include data generated from applying a linear color gradient over a set of text characters in a converted layout.

Each of the components 1002-1010 of the text-aware color gradient application system 1000 and their corresponding elements (as shown in FIG. 10) may be in communication with one another using any suitable communication technologies. It will be recognized that although components 1002-1010 and their corresponding elements are shown to be separate in FIG. 10, any of components 1002-1010 and their corresponding elements may be combined into fewer components, such as into a single facility or module, divided into more components, or configured into different components as may serve a particular embodiment.

The components 1002-1010 and their corresponding elements can comprise software, hardware, or both. For example, the components 1002-1010 and their corresponding elements can comprise one or more instructions stored on a computer-readable storage medium and executable by processors of one or more computing devices. When executed by the one or more processors, the computer-executable instructions of the text-aware color gradient application system 1000 can cause a client device and/or a server device to perform the methods described herein. Alternatively, the components 1002-1010 and their corresponding elements can comprise hardware, such as a special purpose processing device to perform a certain function or group of functions. Additionally, the components 1002-1010 and their corresponding elements can comprise a combination of computer-executable instructions and hardware.

Furthermore, the components 1002-1010 of the text-aware color gradient application system 1000 may, for example, be implemented as one or more stand-alone applications, as one or more modules of an application, as one or more plug-ins, as one or more library functions or functions that may be called by other applications, and/or as a cloud-computing model. Thus, the components 1002-1010 of the text-aware color gradient application system 1000 may be implemented as a stand-alone application, such as a desktop or mobile application. Furthermore, the components 1002-1010 of the text-aware color gradient application system 1000 may be implemented as one or more web-based applications hosted on a remote server. Alternatively, or additionally, the components of the text-aware color gradient application system 1000 may be implemented in a suit of mobile device applications or "apps." To illustrate, the components of the text-aware color gradient application system 1000 may be implemented in a document processing application or an image processing application, including but not limited to ADOBE® Acrobat, ADOBE® Photoshop, and ADOBE® Illustrator. "ADOBE®" is either a registered trademark or trademark of Adobe Inc. in the United States and/or other countries.

Figure 11:
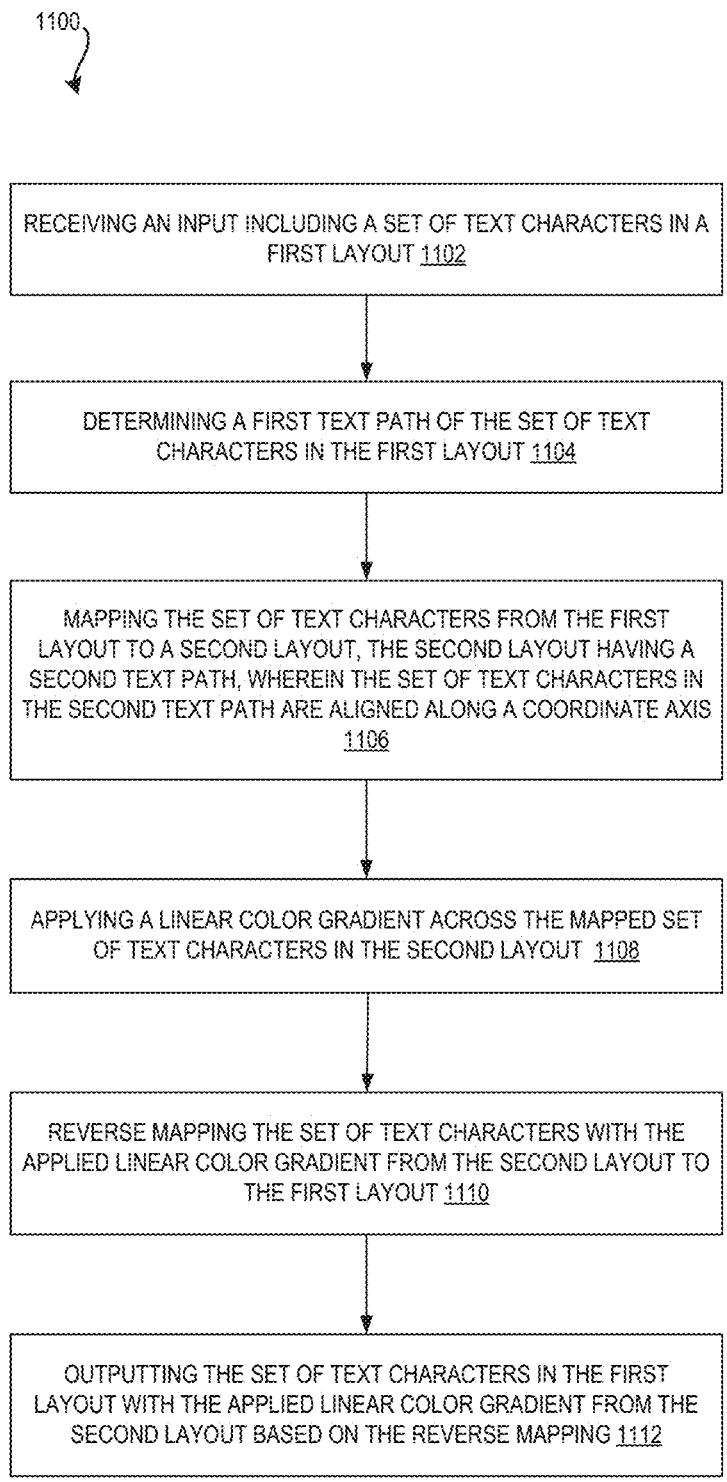
FIG. 11 illustrates a flowchart of a series of acts in a method of applying a color gradient to text characters in accordance with one or more embodiments.

FIGS. 1-10, the corresponding text, and the examples, provide a number of different systems and devices that allows a text-aware color gradient application system to determine an application of a color gradient onto received input (e.g., text). In addition to the foregoing, embodiments can also be described in terms of flowcharts comprising acts and steps in a method for accomplishing a particular result. For example, FIG. 11 illustrates a flowchart of an exemplary method in accordance with one or more embodiments. The method described in relation to FIG. 11 may be performed with less or more steps/acts or the steps/acts may be performed in differing orders. Additionally, the steps/acts described herein may be repeated or performed in parallel with one another or in parallel with different instances of the same or similar steps/acts.

FIG. 11 illustrates a flowchart 1100 of a series of acts in a method of applying a color gradient to text characters in accordance with one or more embodiments. In one or more embodiments, the method 1100 is performed in a digital medium environment that includes the text-aware color gradient application system 1000. The method 1100 is intended to be illustrative of one or more methods in accordance with the present disclosure and is not intended to limit potential embodiments. Alternative embodiments can include additional, fewer, or different steps than those articulated in FIG. 11.

As shown in FIG. 11, the method 1100 includes an act 1102 of receiving, by a text flow analyzer of the text-aware color gradient application system, an input including a set of text characters in a first layout (or original layout). For example, the text-aware color gradient application system can receive the input from a user (e.g., via a computing device). In one or more embodiments, a user may submit a set of text characters as an input in a document processing application or an image processing application. In one or more embodiments, a user may select an image, document, or file in a document processing application or an image processing application, or the user may submit an image, document, or file to a web service or an application configured to receive inputs.

As shown in FIG. 11, the method 1100 also includes an act 1104 of determining, by the text flow analyzer, a first text path of the set of text characters in the first layout. In one or more embodiments, the image, document, or file includes a set of text characters that the text-aware color gradient application system can identify as the set of text characters in the first layout. In one or more embodiments, determining a first text path of the set of text characters includes determining whether the first text path is a linear path or a non-linear path (e.g., Bezier curve). In one or more embodiments, where the first text path is a linear path, the text-aware color gradient application system can determine a global transformation that can be performed on a global bounding box that encompasses the set of text characters to align the global bounding box to a coordinate axis. In one or more embodiments, where the first text path is a non-linear path, the text-aware color gradient application system can determine local bounding boxes for each character and local transformations that can be performed on each of the local bounding boxes to align each of the local bounding boxes to a coordinate axis.

As shown in FIG. 11, the method 1100 also includes an act 1106 of mapping, by a text mapping module, the set of text characters from the first layout to a second layout (or converted layout), the second layout having a second text path in which the set of text characters are aligned along a coordinate axis. In one or more embodiments, the text-aware color gradient application system can determine a first text path of the set of text characters and map the set of text characters to a second text path in a second layout, where the second text path is a single linear line parallel to a coordinate axis (e.g., x-axis or y-axis). In one or more embodiments, where the first layout includes multiple lines of text characters, the text-aware color gradient application system creates the second layout by remove line/paragraph separations and combining the text characters from the multiple lines into a single line aligned to a coordinate axis.

In one or more embodiments, the text-aware color gradient application system maintains the relative positioning of the text characters when mapping from the first layout to the second layout. In one or more embodiments, the relative positions between consecutive text characters is maintained by determining a value of the distance between the tops of the consecutive bounding boxes for the consecutive text characters in the first layout and a value of the distance between the bottoms of the consecutive bounding boxes for the consecutive text characters in the first layout and averaging the two values. In one or more embodiments, the averaged value is used as the amount of spacing between the consecutive text characters in the second layout.

In one or more embodiments, mapping the set of text characters from the first layout to a second layout includes adjusting a spacing between bounding boxes of each consecutive pair of text characters to eliminate any spacing between the consecutive pair of text characters. In such embodiments, when spacing between bounding boxes can be adjusted to decrease, increase, or eliminate the spacing in between text characters.

As shown in FIG. 11, the method 1100 also includes an act 1108 of applying, by a color gradient applicator module, a linear color gradient across the mapped set of text characters in the second layout. In one or more embodiments, the text-aware color gradient application system generates the linear color gradient by determining a global bounding box for the second layout. In one embodiment, the global bounding box is approximately the length of the combined local bounding boxes of the individual text characters and the height of the tallest local bounding box. In one or more embodiments, using received color stop locations and colors with respect to the global bounding box, the text-aware color gradient application system generates color gradient data by interpolating the regions between pairs of consecutive or adjacent color stop locations using the colors associated with a given pair of consecutive color stop locations.

As shown in FIG. 11, the method 1100 also includes an act 1110 of reverse mapping, by the color gradient applicator module, the set of text characters with the applied linear color gradient from the second layout to the first layout. In one or more embodiments, reverse mapping from the second layout to the first layout includes storing color gradient data generated by the color gradient applicator module as metadata in corresponding render nodes of a render tree used for rendering the set of text characters in the first layout with the applied color gradient. In one or more embodiments, reverse mapping from the second layout to the first layout can further include storing data representing the mapping of text characters from the first layout to the second layout as metadata in corresponding render nodes of a render tree used for rendering the set of text characters in the first layout with the applied color gradient.

As shown in FIG. 11, the method 1100 also includes an act 1112 of outputting, by the color gradient applicator module, the set of text characters in the first layout with the applied linear color gradient from the second layout based on the reverse mapping. For example, the set of text characters in the first layout with the applied linear color gradient can be rendered on a display of the user computing device that provided the input set of text characters.

Figure 12:
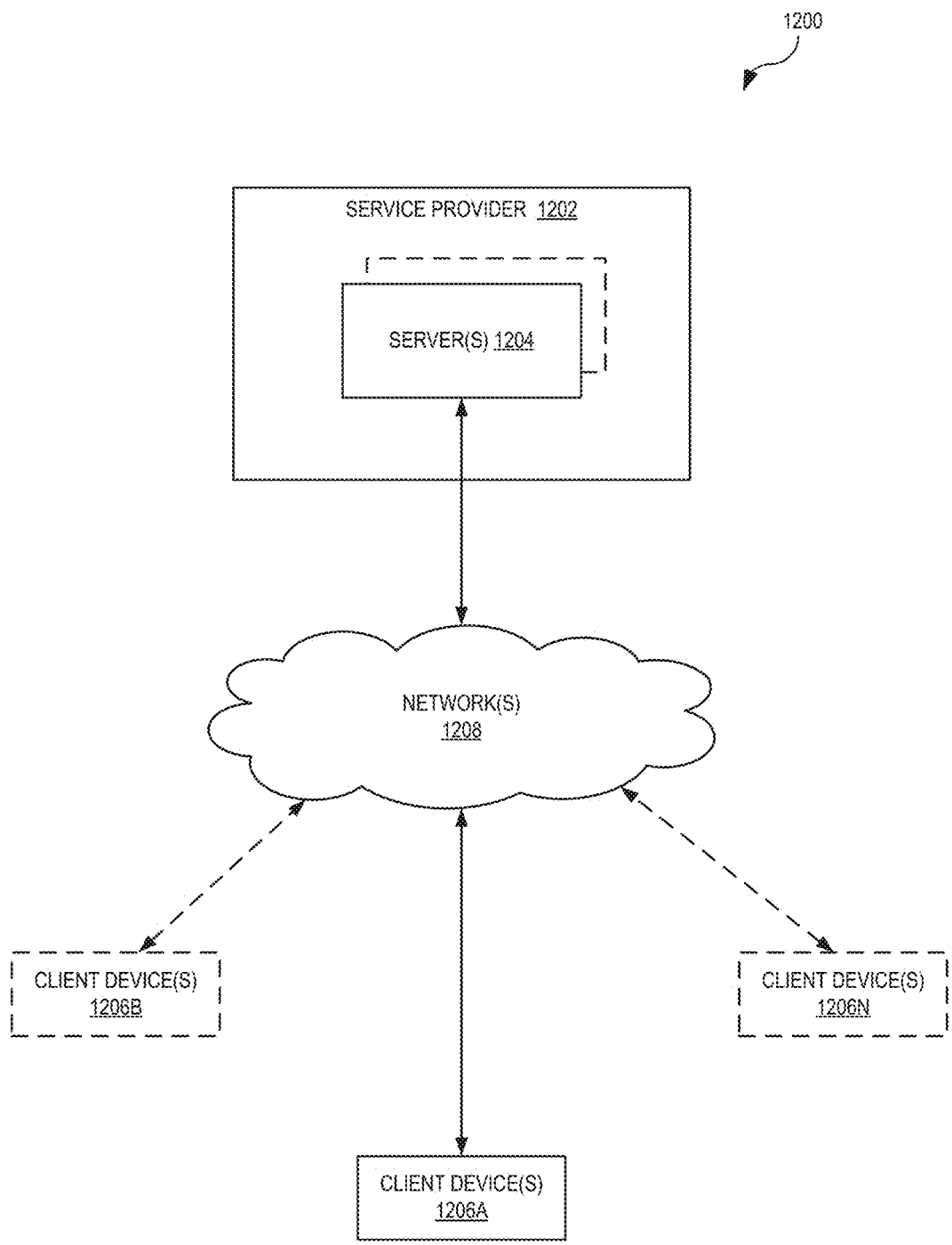
FIG. 12 illustrates a schematic diagram of an exemplary environment in which the context-aware text color recommendation system can operate in accordance with one or more embodiments.

FIG. 12 illustrates a schematic diagram of an exemplary environment 1200 in which the text-aware color gradient application system 1000 can operate in accordance with one or more embodiments. In one or more embodiments, the environment 1200 includes a service provider 1202 which may include one or more servers 1204 connected to a plurality of client devices 1206A-1206N via one or more networks 1208. The client devices 1206A-1206N, the one or more networks 1208, the service provider 1202, and the one or more servers 1204 may communicate with each other or other components using any communication platforms and technologies suitable for transporting data and/or communication signals, including any known communication technologies, devices, media, and protocols supportive of remote data communications, examples of which will be described in more detail below with respect to FIG. 13.

Although FIG. 12 illustrates a particular arrangement of the client devices 1206A-1206N, the one or more networks 1208, the service provider 1202, and the one or more servers 1204, various additional arrangements are possible. For example, the client devices 1206A-1206N may directly communicate with the one or more servers 1204, bypassing the network 1208. Or alternatively, the client devices 1206A-1206N may directly communicate with each other. The service provider 1202 may be a public cloud service provider which owns and operates their own infrastructure in one or more data centers and provides this infrastructure to customers and end users on demand to host applications on the one or more servers 1204. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1204. In some embodiments, the service provider may be a private cloud provider which maintains cloud infrastructure for a single organization. The one or more servers 1204 may similarly include one or more hardware servers, each with its own computing resources, which are divided among applications hosted by the one or more servers for use by members of the organization or their customers.

Similarly, although the environment 1200 of FIG. 12 is depicted as having various components, the environment 1200 may have additional or alternative components. For example, the environment 1200 can be implemented on a single computing device with the text-aware color gradient application system 1000. In particular, the text-aware color gradient application system 1000 may be implemented in whole or in part on the client device 1202A.

As illustrated in FIG. 12, the environment 1200 may include client devices 1206A-1206N. The client devices 1206A-1206N may comprise any computing device. For example, client devices 1206A-1206N may comprise one or more personal computers, laptop computers, mobile devices, mobile phones, tablets, special purpose computers, TVs, or other computing devices, including computing devices described below with regard to FIG. 13. Although three client devices are shown in FIG. 12, it will be appreciated that client devices 1206A-1206N may comprise any number of client devices (greater or smaller than shown).

Moreover, as illustrated in FIG. 12, the client devices 1206A-1206N and the one or more servers 1204 may communicate via one or more networks 1208. The one or more networks 1208 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1208 may be any suitable network over which the client devices 1206A-1206N may access service provider 1202 and server 1204, or vice versa. The one or more networks 1208 will be discussed in more detail below with regard to FIG. 13.

In addition, the environment 1200 may also include one or more servers 1204. The one or more servers 1204 may generate, store, receive, and transmit any type of data, including text character mapping data 1018, color gradient data 1020, or other information. For example, a server 1204 may receive data from a client device, such as the client device 1206A, and send the data to another client device, such as the client device 1202B and/or 1202N. The server 1204 can also transmit electronic messages between one or more users of the environment 1200. In one example embodiment, the server 1204 is a data server. The server 1204 can also comprise a communication server or a web-hosting server. Additional details regarding the server 1204 will be discussed below with respect to FIG. 13.

As mentioned, in one or more embodiments, the one or more servers 1204 can include or implement at least a portion of the text-aware color gradient application system 1000. In particular, the text-aware color gradient application system 1000 can comprise an application running on the one or more servers 1204 or a portion of the text-aware color gradient application system 1000 can be downloaded from the one or more servers 1204. For example, the text-aware color gradient application system 1000 can include a web hosting application that allows the client devices 1206A-1206N to interact with content hosted at the one or more servers 1204. To illustrate, in one or more embodiments of the environment 1200, one or more client devices 1206A-1206N can access a webpage supported by the one or more servers 1204. In particular, the client device 1206A can run a web application (e.g., a web browser) to allow a user to access, view, and/or interact with a webpage or website hosted at the one or more servers 1204.

Upon the client device 1206A accessing a webpage or other web application hosted at the one or more servers 1204, in one or more embodiments, the one or more servers 1204 can provide a user of the client device 1206A with an interface to provide an input (e.g., text or a document including text), or an interface to select a portion of a document including text. In one or more embodiments, the one or more servers 1204 can further provide a user of the client device 1206A with an interface to provide color selections. Upon receiving the input text and the color selections, the one or more servers 1204 can automatically perform the methods and processes described above to apply a color gradient to the input text. The one or more servers 1204 can provide an output including the input text with the applied color gradient to the client device 1206A for display to the user.

As just described, the text-aware color gradient application system 1000 may be implemented in whole, or in part, by the individual elements 1202-1208 of the environment 1200. It will be appreciated that although certain components of the text-aware color gradient application system 1000 are described in the previous examples with regard to particular elements of the environment 1200, various alternative implementations are possible. For instance, in one or more embodiments, the text-aware color gradient application system 1000 is implemented on any of the client devices 1206A-N. Similarly, in one or more embodiments, the text-aware color gradient application system 1000 may be implemented on the one or more servers 1204. Moreover, different components and functions of the text-aware color gradient application system 1000 may be implemented separately among client devices 1206A-1206N, the one or more servers 1204, and the network 1208.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
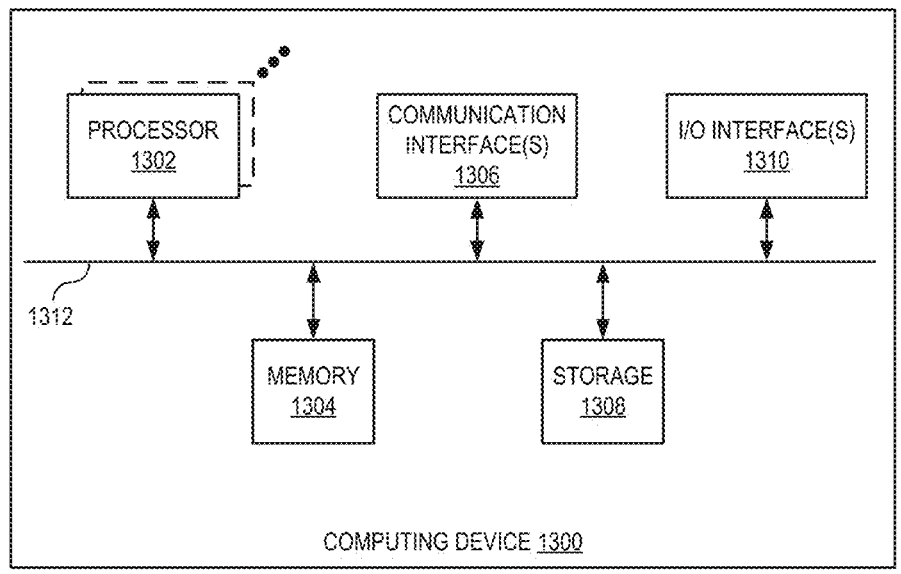
FIG. 13 illustrates a block diagram of an exemplary computing device in accordance with one or more embodiments.

FIG. 13 illustrates, in block diagram form, an exemplary computing device 1300 that may be configured to perform one or more of the processes described above. One will appreciate that one or more computing devices such as the computing device 1300 may implement the text-aware color gradient application system 1000. As shown by FIG. 13, the computing device can comprise a processor 1302, memory 1304, one or more communication interfaces 1306, a storage device 1308, and one or more I/O devices/interfaces 1310. In certain embodiments, the computing device 1300 can include fewer or more components than those shown in FIG. 13. Components of computing device 1300 shown in FIG. 13 will now be described in additional detail.

In particular embodiments, processor(s) 1302 includes hardware for executing instructions, such as those making up a computer program. As an example, and not by way of limitation, to execute instructions, processor(s) 1302 may retrieve (or fetch) the instructions from an internal register, an internal cache, memory 1304, or a storage device 1308 and decode and execute them. In various embodiments, the processor(s) 1302 may include one or more central processing units (CPUs), graphics processing units (GPUs), field programmable gate arrays (FPGAs), systems on chip (SoC), or other processor(s) or combinations of processors.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1304 may be internal or distributed memory.

The computing device 1300 can further include one or more communication interfaces 1306. A communication interface 1306 can include hardware, software, or both. The communication interface 1306 can provide one or more interfaces for communication (such as, for example, packet-based communication) between the computing device and one or more other computing devices 1300 or one or more networks. As an example, and not by way of limitation, communication interface 1306 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can comprise hardware, software, or both that couples components of computing device 1300 to each other.

The computing device 1300 includes a storage device 1308 includes storage for storing data or instructions. As an example, and not by way of limitation, storage device 1308 can comprise a non-transitory storage medium described above. The storage device 1308 may include a hard disk drive (HDD), flash memory, a Universal Serial Bus (USB) drive or a combination these or other storage devices. The computing device 1300 also includes one or more input or output ("I/O") devices/interfaces 1310, which are provided to allow a user to provide input to (such as user strokes), receive output from, and otherwise transfer data to and from the computing device 1300. These I/O devices/interfaces 1310 may include a mouse, keypad or a keyboard, a touch screen, camera, optical scanner, network interface, modem, other known I/O devices or a combination of such I/O devices/interfaces 1310. The touch screen may be activated with a stylus or a finger.

The I/O devices/interfaces 1310 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1310 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method, comprising:
   receiving an input including a set of text characters in a first layout;
   determining a first text path of the set of text characters in the first layout;
   mapping the set of text characters from the first layout to a second layout, the second layout having a second text path, wherein the set of text characters in the second text path are aligned along a coordinate axis;
   applying a linear color gradient across the mapped set of text characters in the second layout;
   reverse mapping the set of text characters with the applied linear color gradient from the second layout to the first layout; and
   outputting the set of text characters in the first layout with the applied linear color gradient from the second layout based on the reverse mapping.

2. The computer-implemented method of claim 1, wherein mapping the set of text characters from the first layout to the second layout comprises:
   for each consecutive pair of text characters in the second layout, adjusting a spacing between bounding boxes of the consecutive pair of text characters to eliminate any spacing between the consecutive pair of text characters.

3. The computer-implemented method of claim 1, wherein mapping the set of text characters from the first layout to the second layout comprises:
   for each consecutive pair of text characters in the second layout:
      calculating a first distance between a top of a first bounding box for a first text character and a top of a second bounding box for a second text character,
      calculating a second distance between a bottom of the first bounding box for the first text character and a bottom of the second bounding box for the second text character,
      calculating an average distance based on the calculated first distance and second distance, and
      spacing the first text character and the second text character based on the calculated average distance.

4. The computer-implemented method of claim 1, wherein applying the linear color gradient across the mapped set of text characters in the second layout comprises:
   determining a global bounding box for the second layout;
   receiving color stop locations within the global bounding box and a color associated with each color stop location; and
   for each pair of consecutive color stop locations, determining color gradient data for a region of the global bounding box between the pair of consecutive color stop locations by:
      interpolating the region of the global bounding box between the pair of consecutive color stop locations using the colors associated with the pair of consecutive color stop locations.

5. The computer-implemented method of claim 4, wherein mapping the set of text characters from the first layout to the second layout comprises:
   determining that the first text path of the of the set of text characters is a Bezier curve;
   for each text character in the set of text characters,
      determining local transformation data for the text character, the local transformation data indicating an amount of rotation of the text character from the first layout to the second layout, and
      storing the local transformation data.

6. The computer-implemented method of claim 5, further comprising:
   for each of the text characters in the second layout,
      detecting a local bounding box for the text character aligned to the coordinate axis, determining a local gradient over the local bounding
box by:
identifying a color stop location associated with a
global bounding box for
the second layout within the local bounding box,
adding a start color stop location at the start of the
local bounding box and an end color stop location
at the end of the local bounding box, and
detecting a first color associated with the start color
stop location and a second color associated with
the end color stop location, and
applying the local transformation data associated with
the text character to rotate the local bounding box.

7. The computer-implemented method of claim 4, further comprising:
for each text character object in a render tree, storing the color gradient data and data representing the mapping of the text character from the first layout to the second layout as metadata in a corresponding node of the render tree.

8. The computer-implemented method of claim 1, wherein mapping the set of text characters from the first layout to the second layout comprises:
determining that the first text path of the of the set of text characters includes text characters on multiple lines; and
aligning the set of text characters from the multiple lines to the coordinate axis.

9. A non-transitory computer-readable storage medium including instructions stored thereon which, when executed by at least one processor, cause the at least one processor to:
receive an input including a set of text characters in a first layout;
determine a first text path of the set of text characters in the first layout;
map the set of text characters from the first layout to a second layout, the second layout having a second text path, wherein the set of text characters in the second text path are aligned along a coordinate axis;
apply a linear color gradient across the mapped set of text characters in the second layout;
reverse map the set of text characters with the applied linear color gradient from the second layout to the first layout; and
output the set of text characters in the first layout with the applied linear color gradient from the second layout based on the reverse mapping.

10. The non-transitory computer-readable storage medium of claim 9, wherein mapping the set of text characters from the first layout to the second layout comprises:
for each consecutive pair of text characters in the second layout, adjusting a spacing between bounding boxes of the consecutive pair of text characters to eliminate any spacing between the consecutive pair of text characters.

11. The non-transitory computer-readable storage medium of claim 9, wherein mapping the set of text characters from the first layout to the second layout comprises:
for each consecutive pair of text characters in the second layout:
calculating a first distance between a top of a first bounding box for a first text character and a top of a second bounding box for a second text character,
calculating a second distance between a bottom of the first bounding box for the first text character and a bottom of the second bounding box for the second text character,
calculating an average distance based on the calculated first distance and second distance, and
spacing the first text character and the second text character based on the calculated average distance.

12. The non-transitory computer-readable storage medium of claim 9, applying the linear color gradient across the mapped set of text characters in the second layout comprises:
determining a global bounding box for the second layout;
receiving color stop locations within the global bounding box and a color associated with each color stop location; and
for each pair of consecutive color stop locations, determining color gradient data for a region of the global bounding box between the pair of consecutive color stop locations by:
interpolating the region of the global bounding box between the pair of consecutive color stop locations using the colors associated with the pair of consecutive color stop locations.

13. The non-transitory computer-readable storage medium of claim 12, wherein mapping the set of text characters from the first layout to the second layout comprises:
determining that the first text path of the of the set of text characters is a Bezier curve;
for each text character in the set of text characters,
determining local transformation data for the text character, the local transformation data indicating an amount of rotation of the text character from the first layout to the second layout, and
storing the local transformation data.

14. The non-transitory computer-readable storage medium of claim 13, wherein the instructions further cause the at least one processor to:
for each of the text characters in the second layout,
detect a local bounding box for the text character aligned to the coordinate axis,
determine a local gradient over the local bounding box by:
identifying a color stop location associated with a global bounding box for the second layout within the local bounding box,
adding a start color stop location at the start of the local bounding box and an end color stop location at the end of the local bounding box, and
detecting a first color associated with the start color stop location and a second color associated with the end color stop location, and
apply the local transformation data associated with the text character to rotate the local bounding box.

15. A system, comprising:
a computing device including a memory and at least one processor, the computing device implementing a text-aware color gradient application system,
wherein the memory includes instructions stored thereon which, when executed, cause the text-aware color gradient application system to:
receive an input including a set of text characters in a first layout;
determine a first text path of the set of text characters in the first layout;
map the set of text characters from the first layout to a second layout, the second layout having a second text path, wherein the set of text characters in the second text path are aligned along a coordinate axis;

apply a linear color gradient across the mapped set of text characters in the second layout;

reverse map the set of text characters with the applied linear color gradient from the second layout to the first layout; and output the set of text characters in the first layout with the applied linear color gradient from the second layout based on the reverse mapping.

16. The system of claim 15, wherein the instructions to map the set of text characters from the first layout to the second layout, when executed, further causes the text-aware color gradient application system to:

for each consecutive pair of text characters in the second layout, adjust a spacing between bounding boxes of the consecutive pair of text characters to eliminate any spacing between the consecutive pair of text characters.

17. The system of claim 15, wherein the instructions to map the set of text characters from the first layout to the second layout, when executed, further causes the text-aware color gradient application system to:

for each consecutive pair of text characters in the second layout:

calculate a first distance between a top of a first bounding box for a first text character and a top of a second bounding box for a second text character, calculate a second distance between a bottom of the first bounding box for the first text character and a bottom of the second bounding box for the second text character, calculate an average distance based on the calculated first distance and second distance, and space the first text character and the second text character based on the calculated average distance.

18. The system of claim 15, wherein the instructions to apply the linear color gradient across the mapped set of text characters in the second layout, when executed, further causes the text-aware color gradient application system to:

determine a global bounding box for the second layout;

receive color stop locations within the global bounding box and a color associated with each color stop location; and for each pair of consecutive color stop locations, determining color gradient data for a region of the global bounding box between the pair of consecutive color stop locations by:

interpolating the region of the global bounding box between the pair of consecutive color stop locations using the colors associated with the pair of consecutive color stop locations.

19. The system of claim 18, wherein the instructions to map the set of text characters from the first layout to the second layout, when executed, further causes the text-aware color gradient application system to:

determine that the first text path of the of the set of text characters is a Bezier curve;

for each text character in the set of text characters, determine local transformation data for the text character, the local transformation data indicating an amount of rotation of the text character from the first layout to the second layout, and store the local transformation data.

20. The system of claim 19, wherein the instructions further cause the text-aware color gradient application system to:

for each of the text characters in the second layout, detect a local bounding box for the text character aligned to the coordinate axis, determine a local gradient over the local bounding box by:

identifying a color stop location associated with a global bounding box for the second layout within the local bounding box, adding a start color stop location at the start of the local bounding box and an end color stop location at the end of the local bounding box, and detecting a first color associated with the start color stop location and a second color associated with the end color stop location, and apply the local transformation data associated with the text character to rotate the local bounding box.

* * * * *